United States Patent [19]

Katznelson et al.

[11] Patent Number: 5,091,936
[45] Date of Patent: Feb. 25, 1992

[54] SYSTEM FOR COMMUNICATING TELEVISION SIGNALS OR A PLURALITY OF DIGITAL AUDIO SIGNALS IN A STANDARD TELEVISION LINE ALLOCATION

[75] Inventors: Ron D. Katznelson, San Diego; Paul Moroney, Cardiff; W. Allen Shumate, San Diego, all of Calif.

[73] Assignee: General Instrument Corporation, Hatboro, Pa.

[21] Appl. No.: 647,827

[22] Filed: Jan. 30, 1991

[51] Int. Cl.5 .......................................... H04N 7/167
[52] U.S. Cl. .................................... 380/19; 358/142
[58] Field of Search .................. 380/19; 358/141, 142, 358/143, 144

[56] References Cited

U.S. PATENT DOCUMENTS

| | | |
|---|---|---|
| 3,789,137 | 1/1974 | Newell . |
| 3,872,503 | 3/1975 | Shutterly . |
| 4,295,223 | 10/1981 | Shutterly . |
| 4,563,702 | 1/1986 | Heller et al. . |
| 4,608,456 | 8/1986 | Paik et al. . |
| 4,613,901 | 9/1986 | Gilhousen et al. . |
| 4,634,808 | 1/1987 | Moerder . |
| 4,688,246 | 8/1987 | Eilers et al. ............................ 380/19 |
| 4,719,505 | 1/1988 | Katznelson . |
| 4,787,085 | 11/1988 | Suto et al. . |
| 4,821,097 | 4/1989 | Robbins . |
| 4,864,615 | 9/1989 | Bennett et al. . |

Primary Examiner—Thomas H. Tarcza
Assistant Examiner—David Cain
Attorney, Agent, or Firm—Barry R. Lipsitz

[57] ABSTRACT

A system is provided for selectively transmitting horizontal television lines including video and digital audio components or equivalent digital data lines containing a plurality of audio program signals. A conventional television signal transmission places a digital audio signal in the horizontal blanking interval, followed by analog video information. In accordance with the present invention, the "window" containing the analog video information is replaced with a plurality of digital audio signals that are time division multiplexed within the window. An additional audio channel is placed in the horizontal blanking interval, at the same location the audio is placed when video information is transmitted. Selector switches are provided in the encoder and decoder for processing a composite waveform as either a video signal with an associated audio channel, or as a multiple channel digital audio signal. Independent encryption and decryption of each of the multiple audio channels is provided.

37 Claims, 4 Drawing Sheets

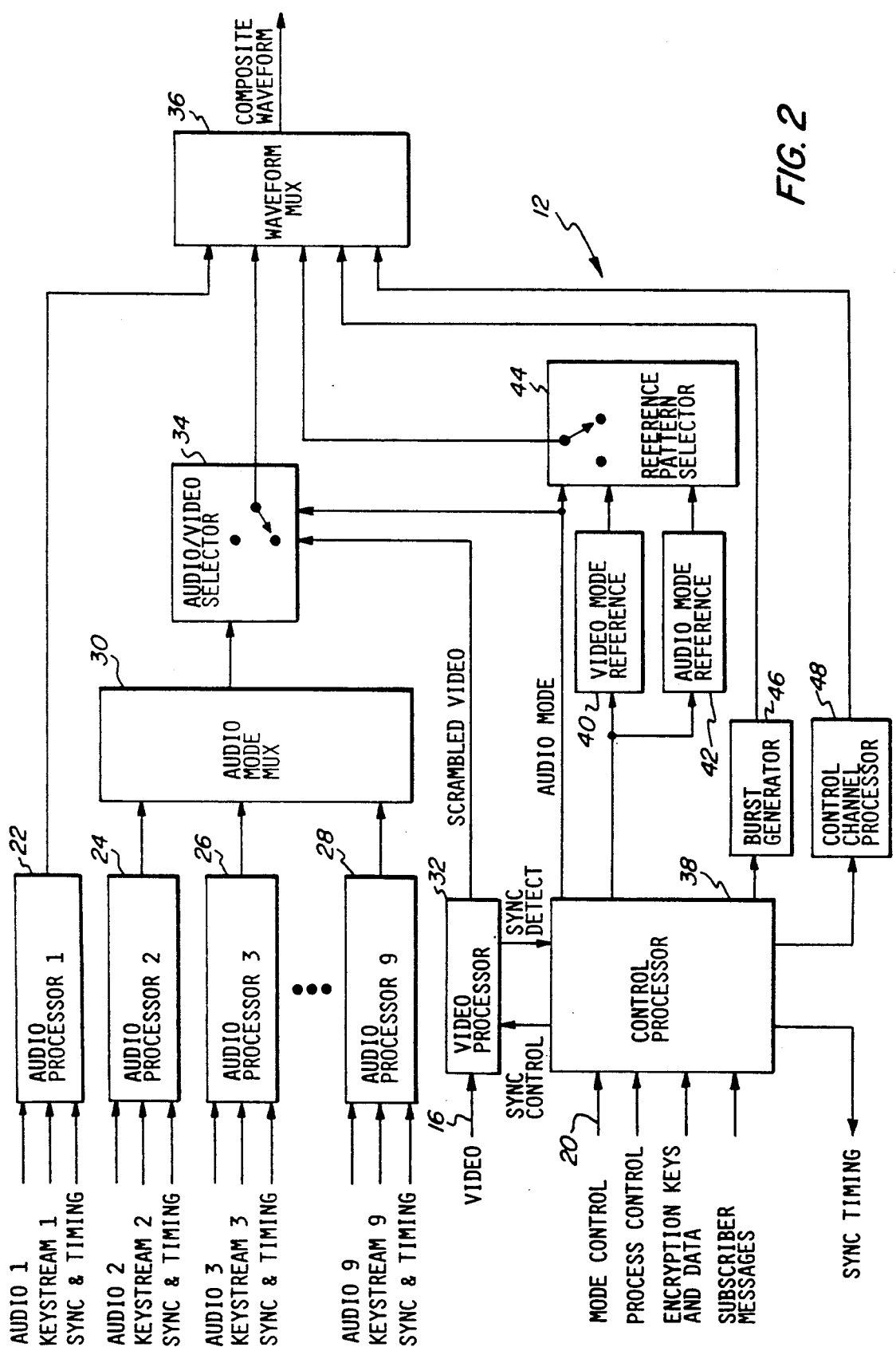

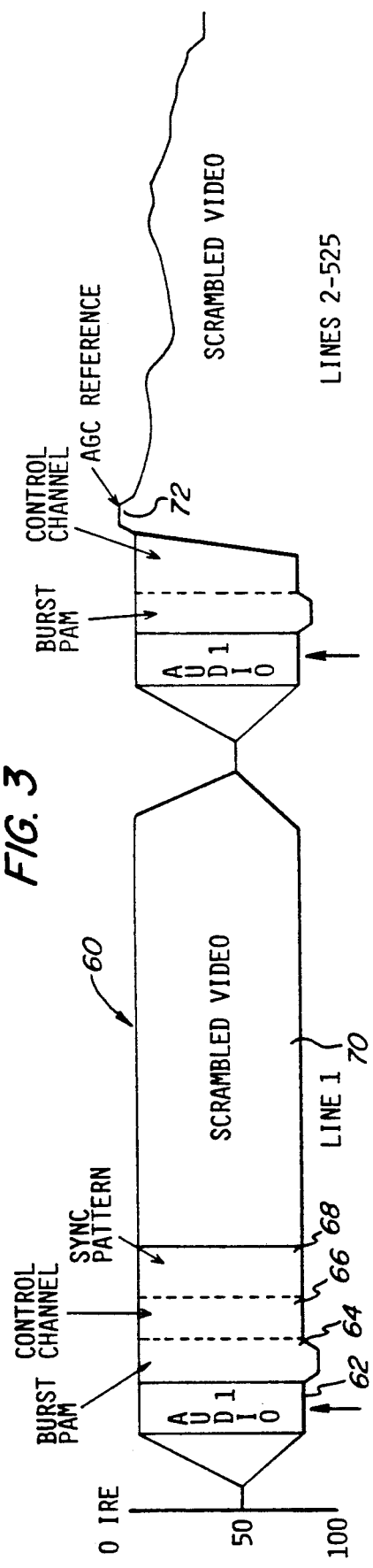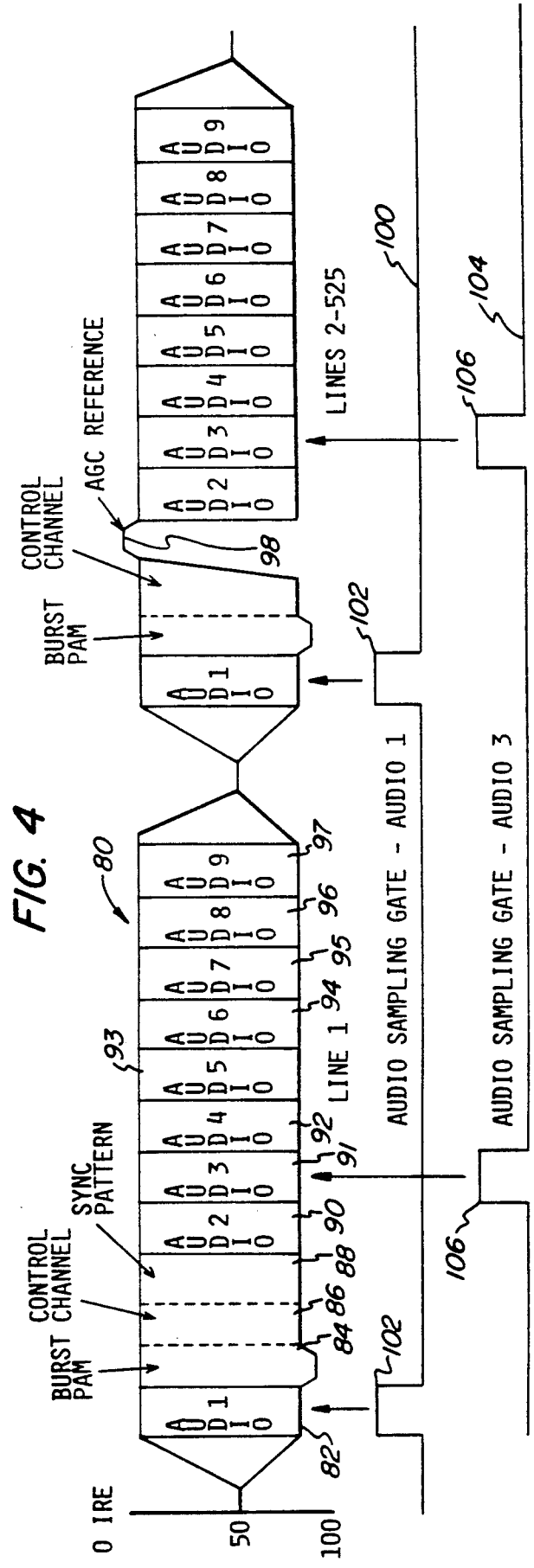

SYSTEM FOR COMMUNICATING TELEVISION SIGNALS OR A PLURALITY OF DIGITAL AUDIO SIGNALS IN A STANDARD TELEVISION LINE ALLOCATION

BACKGROUND OF THE INVENTION

The present invention relates to audio and data signal processing in a television waveform, and more particularly to the use of a television waveform to carry a plurality of separate digital audio/data channels.

There are several known systems for transmitting scrambled digital audio information in nonvideo portions of a video waveform. Two such systems are disclosed in U.S. Pat. No. 4,563,702 entitled "Video Signal Scrambling and Descrambling Systems" to Heller, et al and U.S. Pat. No. 4,613,901 entitled "Signal Encryption and Distribution System for Controlling Scrambling and Selective Remote Descrambling of Television Signals" to Gilhousen, et al, both incorporated herein by reference. These systems provide for digital stereo audio transmission in the horizontal blanking interval of a National Television Standards Committee ("NTSC") television signal.

The systems disclosed in the above referenced patents are primarily concerned with the delivery of television programming which contains both audio and video components. In another known system described in U.S. Pat. No. 4,787,085 entitled "Digital Signal Transmitting System" to Suto, et al, digital signals that are not limited to audio and video components of a television signal are time division multiplexed and modulated to form a signal having a bandwidth corresponding to one channel portion of a television broadcast signal. A receiver extracts the digital data corresponding to a desired signal and supplies it to an appropriate appliance such as a computer, stereo set, or facsimile machine that converts the data into a useful form for a user. In the Suto, et al system, all signals are transmitted in a digital format, requiring a separate receiver that is not compatible with existing cable television converters or satellite television receivers.

In order to increase revenues, subscription cable and satellite television system operators are interested in adding new services to their product offerings. With the advent of high quality digital audio, popularized by the development of compact disc ("CD") players, a market for CD quality audio delivered by subscription television systems has become apparent. In order to reduce costs for the system operators, however, compatibility with existing equipment both at the headend and at the subscriber locations is desired. It would therefore be advantageous to provide a system wherein multiple stereo audio channels having CD quality can be provided in lieu of video information in a standard NTSC television waveform. One of a number of such audio channels might then be selectively decoded based upon a subscriber's input to the decoding device. In a decoder that can accommodate both television signals containing digitized audio in nonvideo portions of the waveform, and waveforms in which video information has been replaced by digitized audio information, a cost advantage can be realized by using common audio detection, demultiplexing and processing circuitry.

The present invention provides a system having the advantages described above. While several prior art multiplexed schemes for multichannel audio only service may exist, the present invention provides the specific advantage of utilizing multiplexed audio data intervals that are matched in periodicity and fit within a time period equal to the horizontal blanking interval ("HBI") of a television waveform.

One object of the present invention is to provide a system for transmission of a plurality of audio and auxiliary data channels in a video waveform by replacing the video portion thereof with a group of audio channels (which may have auxiliary data appended thereto) while also providing digital audio data in nonvideo portions of the waveform. It is a further object of the present invention to enable circuitry that is normally used to receive and decode audio signals present in nonvideo portions of a television waveform to provide decoding of audio and auxiliary data signals that have replaced the video portion of the waveform. It is a still further object of the present invention to provide for the implementation of a scrambled multiple audio service subscriber system using the same key distribution system that is used to secure and provide entitlements for conventional subscription video programming.

SUMMARY OF THE INVENTION

In accordance with the present invention, apparatus is provided for selectively transmitting horizontal television lines including video and digital audio components or equivalent digital data lines containing a plurality of audio program signals. The audio program signals can have auxiliary data appended thereto to provide one or more utility data streams. First means are provided for combining signals into a composite waveform occupying a bandwidth of no more than a single television channel allocation. A first digital audio signal, which may comprise the audio portion of a corresponding video program, is coupled to the first means for inclusion in the composite waveform. Second means provide a multiplexed plurality of digital audio signals, which can be provided by audio compact discs, digital audio tape, or other digital audio program sources. Switch means selectively couple either a video signal or the multiplexed plurality of digital audio signals to the first means for inclusion in the composite waveform. Means operatively associated with the switch means are provided, for coupling identification data to the first means for inclusion in the composite waveform. The identification data indicates whether the composite waveform includes a video signal or the multiplexed plurality of digital audio signals.

The apparatus of the present invention can also include encryption means, operatively associated with the second means, for providing independent encryption of different audio signals. In this manner, subscribers can be individually authorized to receive specific audio programs, with each program encrypted differently than all the others. Control channel data, which can include encryption keys and related data, can be coupled to the first means for inclusion in the composite waveform. Upon receipt of the composite waveform, a decoder extracts the control channel data for use in decrypting audio signals and descrambling any video signal contained in the composite waveform. Timing data is coupled to the first means for inclusion in the composite waveform to support clamping of the video signal and initial phase lock for both video and audio signal processing. When a video signal is being communicated the timing data can comprise, or be derived from, the standard color burst signal.

In a preferred embodiment, the composite waveform comprises a plurality of successive lines of information. Where a video signal is transmitted, the information lines are the horizontal lines that make up successive frames of the video image. Where the video is replaced by the multiplexed plurality of digital audio signals, the successive lines are analogous to the horizontal television lines. A first block in at least one of said lines contains the first digital audio signal data. A second block, following the first block, contains timing (e.g., color burst) data. A third block, following the first block, contains the control channel data. A fourth block, following the first block, contains the identification data. A window, comprising the remaining portion of said line following the first, second, third and fourth blocks, contains video information when the video signal is coupled to the first means and audio information (possibly with appended auxiliary data) when the multiplexed plurality of digital audio signals is coupled to the first means.

A first synchronization control signal is coupled to the first means for inclusion in the composite waveform when the video signal is coupled to the first means. A second synchronization control signal is coupled to the first means for inclusion in the composite waveform when the multiplexed plurality of digital audio signals is coupled to the first means. In a preferred embodiment, the first and second synchronization control signals include the identification data. In an illustrated embodiment, the multiplexed plurality of digital audio signals comprise eight different audio program signals time division multiplexed to fit within an eight data block allocation provided in said window. It will be appreciated that since the window occupies the space normally filled by an analog video portion of a television line, there is a maximum number of blocks into which the window can be subdivided based on the amount of data necessary to be carried in each digital audio signal to provide an acceptable level of quality.

Decoder apparatus for recovering video and digital audio information from a composite waveform in accordance with the present invention recovers an identification signal from a composite waveform. Means responsive to the identification signal determine whether the composite waveform is carrying a line of video information and an associated audio channel or a plurality of digital audio/data channels without video in place of the video information. First means responsive to the determining means recover video and associated digital audio information when provided in the waveform. Second means responsive to the determining means recover a selected digital audio channel from said plurality when digital audio channels are provided in the waveform without video. The composite waveform comprises a plurality of successive lines of information, each divided into a plurality of time slots containing a particular type of data. The time slots are constrained to the same location in each successive line when they contain corresponding digital audio channels from said plurality. In an illustrated embodiment, the second means are responsive to a synchronization signal retrieved from the waveform, to recover data for a selected digital audio channel from the same time slot in each successive line of the waveform containing the selected channel. Similarly, the first means are responsive to a synchronization signal retrieved from the waveform, to recover the associated audio signal from a time slot assigned thereto and recover the video information from a video portion of each line. The synchronization signals can be retrieved from a single line in a set of lines equivalent to a video frame. Thus, for example, the synchronization signals can be provided in only the first line of each video frame, or in just one line of a plurality of video frames.

In an embodiment where the audio channels are encrypted before transmission, means are provided for decrypting a recovered audio channel. Where each audio channel is uniquely encrypted, the decryption provided at the decoder is unique to the recovered channel.

Utility data can be appended to any or all of the audio signals, including the audio signal associated with a video signal. A utility data stream can then be recovered by retrieving the utility data appended to a recovered audio signal.

A decoder for use only in recovering selected audio/data channels transmitted in accordance with the present invention can also be provided. In such a decoder, the means for recovering video information are not necessary.

BRIEF DESCRIPTION OF THE DRAWINGS

FIG. 2 is a detailed block diagram of the scrambler signal processor illustrated in FIG. 1;

FIG. 3 illustrates a television waveform including video and associated digital audio information;

FIG. 4 illustrates a waveform where the scrambled video portion of a television waveform is replaced with a plurality of audio program signals.

DETAILED DESCRIPTION OF THE INVENTION

Figure 1:
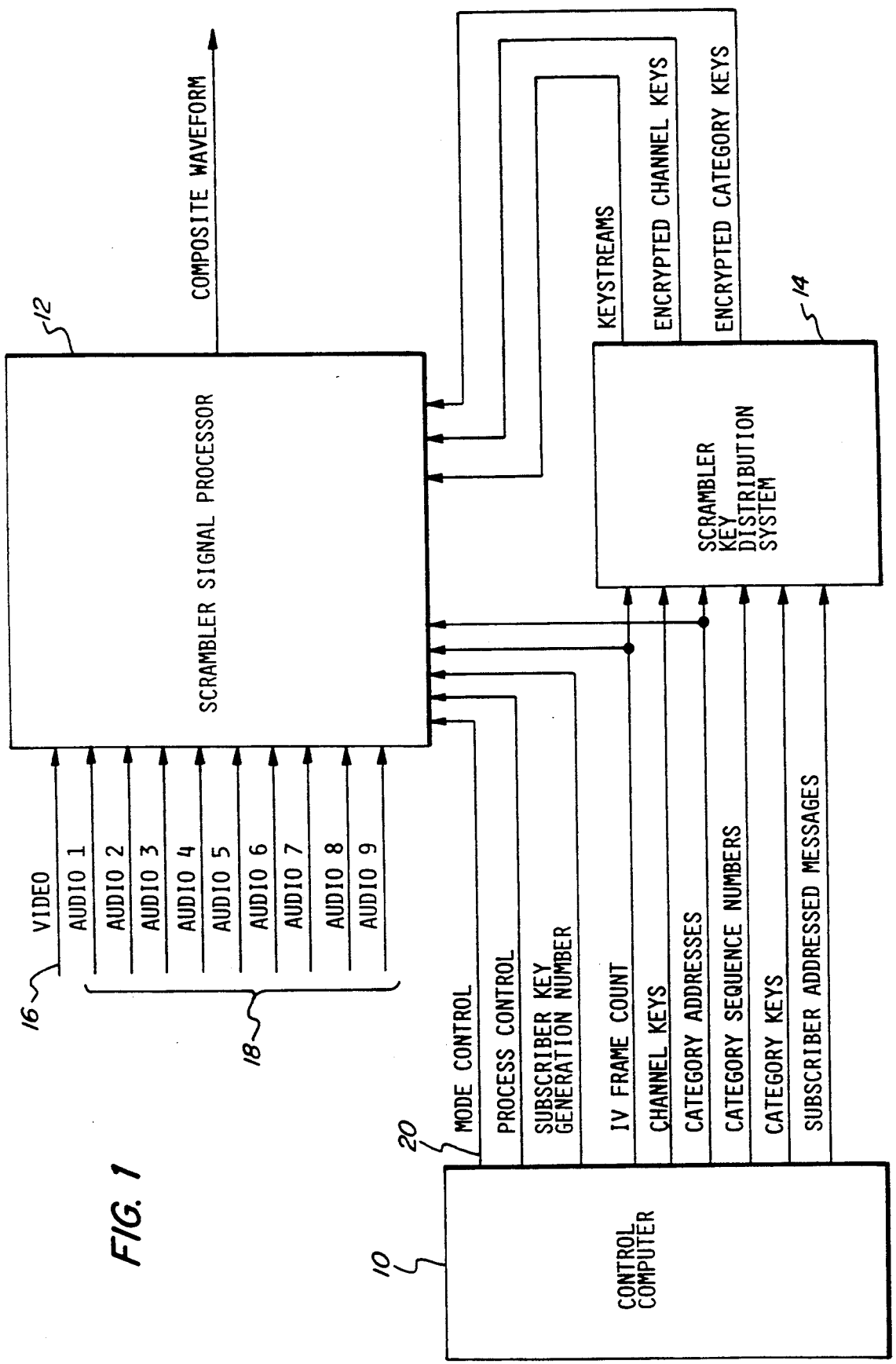
FIG. 1 is a block diagram of a video and audio scrambling system providing for a plurality of digital audio channels in accordance with the present invention.

The present invention provides additional features to the signal encryption system described in Gilhousen, et al U.S. Pat. No. 4,613,901 referred to above, the entire disclosure of which is incorporated herein by reference. Referring to FIG. 1, a preferred embodiment of a scrambling system according to the present invention includes a control computer 10, a scrambler signal processor 12, and a scrambler key distribution system 14. The control computer 10 and scrambler key distribution system 14 functions are disclosed in Gilhousen, et al. Gilhousen, et al also describe a scrambler signal processor having a single audio channel input. In the system of the present invention, as shown in FIG. 1, scrambler signal processor 12 has inputs for nine separate stereo audio channels, generally designated 18, and an additional mode control signal 20 that originates at the control computer 10. The mode control signal is used to select either television or multiple audio/data channel transmission. The "audio 1" signal input to scrambler signal processor 12 is a digital audio signal associated with a television program. This signal, together with its associated video portion 16, is provided to scrambler signal processor 12 as described in Gilhousen, et al. The additional audio channel inputs "audio 2" through "audio 9" provided in accordance with the present invention are signal sources for multiple stereo audio channels. It should be appreciated that other types of audio signal sources can be provided instead of stereo audio channels. For example, one or more of the audio inputs can comprise a plurality of monaural voice channels or the like. It is also noted that when no video signal is input to scrambler signal processor 12, the "audio 1" input can comprise a separate audio signal source just like, but in addition to, the "audio 2" through "audio 9" signal sources. Each of the audio signal sources in accordance with the present invention can also have utility data appended thereto (typically 2-3 bits for each audio packet) to provide a relatively slow speed general purpose utility data channel for each audio channel.

In addition to mode control 20, control computer 10 outputs various other signals to scrambler signal processor 12 and scrambler key distribution system 14. In particular, process control and subscriber key generation number data is input from the control computer to the scrambler signal processor as explained in Gilhousen, et al. Also input to the scrambler signal processor are initial value ("IV") frame count and category address signals for use in connection with the encryption of signals output from scrambler signal processor 12. The IV frame count and category address signals, together with channel key signals, category sequence numbers, category keys, and subscriber addressed messages are input from control computer 10 to scrambler key distribution 14. In turn, scrambler key distribution system 14 provides encrypted channel keys and encrypted category keys to scrambler signal processor 12 for use in encrypting the scrambled waveform output from the scrambler signal processor. A signal called "keystreams", which represents the nine distinct keystreams used to encrypt the separate audio channels in accordance with the present invention is also output from the scrambler key distribution system. Signal encryption techniques that can be used in connection with the system of the present invention are well known, as evidenced by the disclosure in Gilhousen, et al.

FIG. 2 is a block diagram of the scrambler signal processor. As illustrated, the scrambler signal processor includes a control processor 38, a video processor 32, nine separate audio processors 22, 24, 26 . . . 28, a burst generator 46, control channel processor 48, video mode reference pattern generator 40, audio mode reference pattern generator 42, a reference pattern selector 44, an audio mode multiplexer ("MUX") 30, an audio/video selector 34, and a waveform multiplexer 36.

Video processor 32 receives the input video signal and detects the horizontal and vertical synchronization signals therein. Video processor 32 then provides synchronization control and clock signals ("sync detect") derived from the video signal sync signals to the control processor 38. A sync control signal from control processor 38 to video processor 32 is used in conjunction with the video processor to locate a valid synchronization signal in the input video waveform. Video processor 32 also amplifies and filters the video signal, and scrambles the signal, for example, by inverting all active video lines and removing the horizontal and vertical synchronization signals. The resultant scrambled video waveform is provided to the audio/video selector 34.

A first audio processor 22 receives a stereo audio signal source that is normally associated with a television program video signal 16 input to video processor 32. The "audio 1" signal is scrambled and encoded by audio processor 22 using a first keystream ("keystream 1") dedicated to audio processor 22 and synchronization and timing data input to the audio processor. The scrambling and encoding of audio signals by the audio processors is described in Paik et al U.S. Pat. No. 4,608,456 entitled "Digital Audio Scrambling System with Error Conditioning", incorporated herein by reference. The keystreams (e.g., "keystream 1" input to audio processor 22) are provided by the scrambler key distribution system 14 in accordance with the methods disclosed in Gilhousen, et al and in commonly assigned U.S. Pat. Nos. 4,634,808 to Moerder entitled "Descrambler Subscriber Key Production System Utilizing Key Seeds Stored in Descrambler" and U.S. Pat. No. 4,864,615 to Bennett et al entitled "Reproduction of Secure Keys by Using Distributed Key Generation Data", both incorporated herein by reference. Audio processor 22 time compresses each interval of the scrambled audio signal corresponding to the duration of a video signal line into an interval that is less than or equal to the duration of an NTSC horizontal blanking interval. In this manner, the encrypted audio signal can be inserted into the television signal during the horizontal blanking interval.

Insertion of the encrypted audio into the horizontal blanking interval is provided by waveform multiplexer 36, which combines the audio data with the scrambled video from video processor 32 or a multiplexed plurality of digital audio/data signals from audio processors 24, 26, . . . 28. Waveform multiplexer 36 also receives a video mode reference or audio mode reference pattern from reference pattern selector 44, as well as burst data and control channel data from burst generator 46 and control channel processor 48, respectively. All of the various signals coupled to waveform multiplexer 36 are combined into a composite waveform output from the multiplexer for transmission to a receiver.

Audio processors 24, 26, . . . 28 are functionally identical to audio processor 22. However, the audio signal input sources are not generally associated with any video transmission, but instead are provided in accordance with the present invention to enable the delivery of multiple high quality stereo audio services (such as subscription radio services) and appended utility data to authorized subscribers possessing the proper decoder apparatus. Each of the audio processors 24, 26, . . . 28 is provided with a different keystream to provide nine independent scrambled audio services. In addition, synchronization and timing signals are provided to each of the audio processors by control processor 38 to control the encoding and placement of each of the audio channels in the composite waveform. In the illustrated embodiment, the placement of the "audio 1" signal output from audio processor 22 is always in the horizontal blanking interval. In the case of "audio signal 2" through "audio signal 9" output from audio processors 24, 26, . . . 28, placement of the signals is in the video region of each "video" line as illustrated in FIG. 4 and explained in more detail below.

Burst generator 46 provides a timing data signal in response to a control signal from the control processor 38. The transmitted timing data signal may be shorter than the standard color burst length. During the communication of a video signal the timing data can comprise, or be derived from, the standard video color burst signal. In this mode of operation, the sync burst component of the signal is locked to and provided at the same frequency and phase relative to the color burst component of the video signal input to the video processor. If the video is monochrome, or if no video input is provided (e.g., when multiple digital audio channels are provided in lieu of video in accordance with the present invention), data for the phase and frequency of the burst pulse amplitude modulation ("PAM") is provided in the memory of the control processor.

Video mode reference pattern generator 40 and audio mode reference pattern generator 42 provide a synchronization sequence for inclusion in the composite waveform output from multiplexer 36. The video mode reference pattern is used by a decoder, when receiving a composite waveform that includes video data as well as the "audio 1" signal, to recover the video and associated digital audio signals. The audio mode reference pattern is used by the decoder to recover a selected one of the nine audio channels present in the composite waveform when the video portion of a television signal is replaced by the audio signals output from audio processors 24, 26, . . . 28. Reference pattern selector 44 is controlled by an audio mode signal output from control processor 38 (derived from mode control signal 20) to couple the video mode reference pattern to waveform multiplexer 36 when a video signal is being processed, and to couple the audio mode reference pattern to multiplexer 36 when a plurality of digital audio signals is being processed. The selected reference pattern ("synchronization sequence") is inserted by waveform multiplexer 36 into the first line of each "video" frame of the composite waveform at a location 68 illustrated in FIG. 3 for the case where composite waveform 60 includes video information 70, and in location 88 illustrated in FIG. 4 when the composite waveform 80 includes multiple channels of audio information instead of video information.

Audio/video selector 34 is responsive to the audio mode signal output from control processor 38 to select either scrambled audio programming sources from audio mode multiplexer 30, or scrambled video from the video processor 32. Thus, in order to provide a composite waveform as illustrated in FIG. 3, the outputs of audio processor 22, video processor 32, video mode reference 40, burst generator 46, and control channel processor 48 are all coupled to waveform multiplexer 36. In order to produce a composite waveform as illustrated in FIG. 4, the outputs of audio processor 22, audio mode multiplexer 30, audio mode reference 42, burst generator 46, and control channel processor 48 are coupled to waveform multiplexer 36.

A group of control signals ("encryption keys and data") including the IV frame count signal, the encrypted channel key signals, the category address signal, the category sequence number, the encrypted category key signals, and the subscriber key generation number as well as certain of the process control signals intended for the descrambler are provided to the control channel processor 48 which encodes and formats the control signals and outputs them to the waveform multiplexer 36 for insertion into the scrambled waveform at locations 66, 86, respectively, illustrated in FIGS. 3 and 4. The burst signal is provided at locations 64, 84, respectively, in FIGS. 3 and 4.

As illustrated in FIG. 3, a composite waveform carrying video information comprises television audio at location 62, followed by the burst PAM, the control channel information, and either the sync pattern at location 68 (line 1) or an AGC reference level 72 (lines 2-525), followed by the scrambled video information 70. The AGC reference level 72 can comprise, for example, a standard 10 IRE level for use by the receiver in maintaining a proper gain for the received signal. Those skilled in the art will appreciate that a DC reference level is also required to extract data from the waveform. The DC reference level can comprise the average value of the burst PAM (e.g., 50 IRE).

In the case of the first line of information for each 525 line frame, the AGC reference level is replaced with the video mode reference synchronization pattern, that serves to synchronize circuitry in the decoder with the transmitted waveform. In a preferred embodiment, the video mode reference synchronization pattern also communicates the nature of the composite waveform, i.e., that the transmitted waveform contains a television signal rather than multiple audio channels as illustrated in the waveform of FIG. 4.

When the mode control signal at the encoder selects the multiple audio mode of operation, control processor 38 causes audio/video selector 34 to select the output of the audio mode multiplexer to be routed to waveform multiplexer 36 via the audio mode control signal. At the same time, reference pattern selector 44 outputs the audio mode reference pattern to waveform multiplexer 36 for insertion into the sync pattern position 88 in line 1 of composite waveform 80 (FIG. 4). Again, in a preferred embodiment, the audio mode reference synchronization pattern serves to synchronize circuitry in the decoder with the transmitted waveform and to communicate the nature of the transmitted signal, i.e., that the transmitted waveform contains multiple audio channels and not a television signal.

The known scrambling, interleaving, error correction, and PAM techniques used by audio processor 22 to transmit television audio information in the horizontal blanking interval are identically applied by audio processors 24, 26, . . . 28, except that the positions of the audio channels provided by these processors in the composite waveform are offset to place "audio channel 2" through "audio channel 9" in the "video" portion of the waveform. The resultant composite waveform 80 output by waveform multiplexer 36 is illustrated in FIG. 4. Waveform 80 comprises "audio channel 1" in location 82, burst PAM in location 84, and control channel information in location 86 in the horizontal blanking interval along with scrambled "audio channel 2" through "audio channel 9" in the video region of the waveform at locations 90 to 97. In the case of "video" lines 2 to 525, the control channel information is followed by an AGC reference level 98. In line 1, the control channel information is followed by the audio mode reference synchronization pattern.

An example of the signal format and sample timing requirements for multiplexing the diverse signal elements into the NTSC waveform when the multiple audio mode is selected is shown in the following table:

TABLE

| Sample | Lines | # Samples | # μsec. | Signal |
| --- | --- | --- | --- | --- |
| 0–9 | ALL | 10 | 0.70 | FILLER PAM |
| 10–93 | ALL | 84 | 5.87 | AUDIO CHNL #1 |
| 94–139 | ALL | 46 | 3.21 | BURST |
| 140–171 | ALL | 32 | 2.23 | CONTROL CHNL PAM |
| 172–179 | 1 | 8 | 0.56 | PRE-SYNC PAM |
| 180–227 | 1 | 48 | 3.35 | SYNC SEQUENCE PAM |
| 228–235 | 1 | 8 | 0.56 | POST-SYNC PAM |
| 236–319 | ALL | 84 | 5.87 | AUDIO CHNL #2 |
| 320–403 | ALL | 84 | 5.87 | AUDIO CHNL #3 |
| 404–487 | ALL | 84 | 5.87 | AUDIO CHNL #4 |

TABLE-continued

| Sample | Lines | # Samples | # μsec. | Signal |
|---|---|---|---|---|
| 488-571 | ALL | 84 | 5.87 | AUDIO CHNL #5 |
| 572-655 | ALL | 84 | 5.87 | AUDIO CHNL #6 |
| 656-739 | ALL | 84 | 5.87 | AUDIO CHNL #7 |
| 740-823 | ALL | 84 | 5.87 | AUDIO CHNL #8 |
| 824-907 | ALL | 84 | 5.87 | AUDIO CHNL #9 |
| 908-909 | ALL | 2 | 0.14 | FILLER PAM |
| 172-229 | 2-525 | 58 | 4.05 | 10 IRE(AGC) |
| 230-235 | 2-525 | 6 | 0.42 | PRE-PAM |

Some of the signals identified in the above Table are used for wave shaping during the multiple audio signal mode of operation. Wave shaping for this mode can consist entirely of startup and flush of a conventional scrambler transmit pulse amplitude modulation filter. Initializing this filter helps determine the PRE-PAM symbols referred to in the Table, and flushing helps determine the last few PAM samples before a non-PAM waveform section. Both of these operations are designed to maintain smooth waveform transitions. In the multiple audio mode waveform, wave shaping is minimized since the only non-PAM waveform component is the AGC reference level. Before the AGC reference insertion, the transmit filter is producing control channel PAM symbols. In operation, the filter should be flushed with two level PAM I=0 symbols so that the last few samples of the control channel PAM will head towards an acceptable level (e.g., 28.44 IRE). After AGC, the transmit filter must be started up with three two level I=0 symbols, to generate the PRE-PAM samples. Other than for AGC shaping, the transmit filter runs continuously. Various unused PAM output symbols are shown as "FILLER PAM" in the Table. These should be generated from four level PAM I=Q=1 inputs to the transmit filter during the otherwise unspecified input times. Acceptable output sample levels (e.g., 50 IRE) will then result.

In order to retrieve a specific channel of audio information from the waveform of FIG. 4, an audio sampling gate 100 is generated at the decoder in response to a synchronization signal contained in the audio mode reference pattern. To recover the first audio channel from location 82, pulses 102 are generated by the audio sampling gate. In order to recover other audio channels, the pulses produced by the audio sampling gate are shifted to retrieve data from the corresponding audio channel location. Thus, for example, the pulses from the audio sampling gate are shifted as illustrated at 104 to provide pulses 106 to retrieve the "audio 3" channel.

Figure 5:
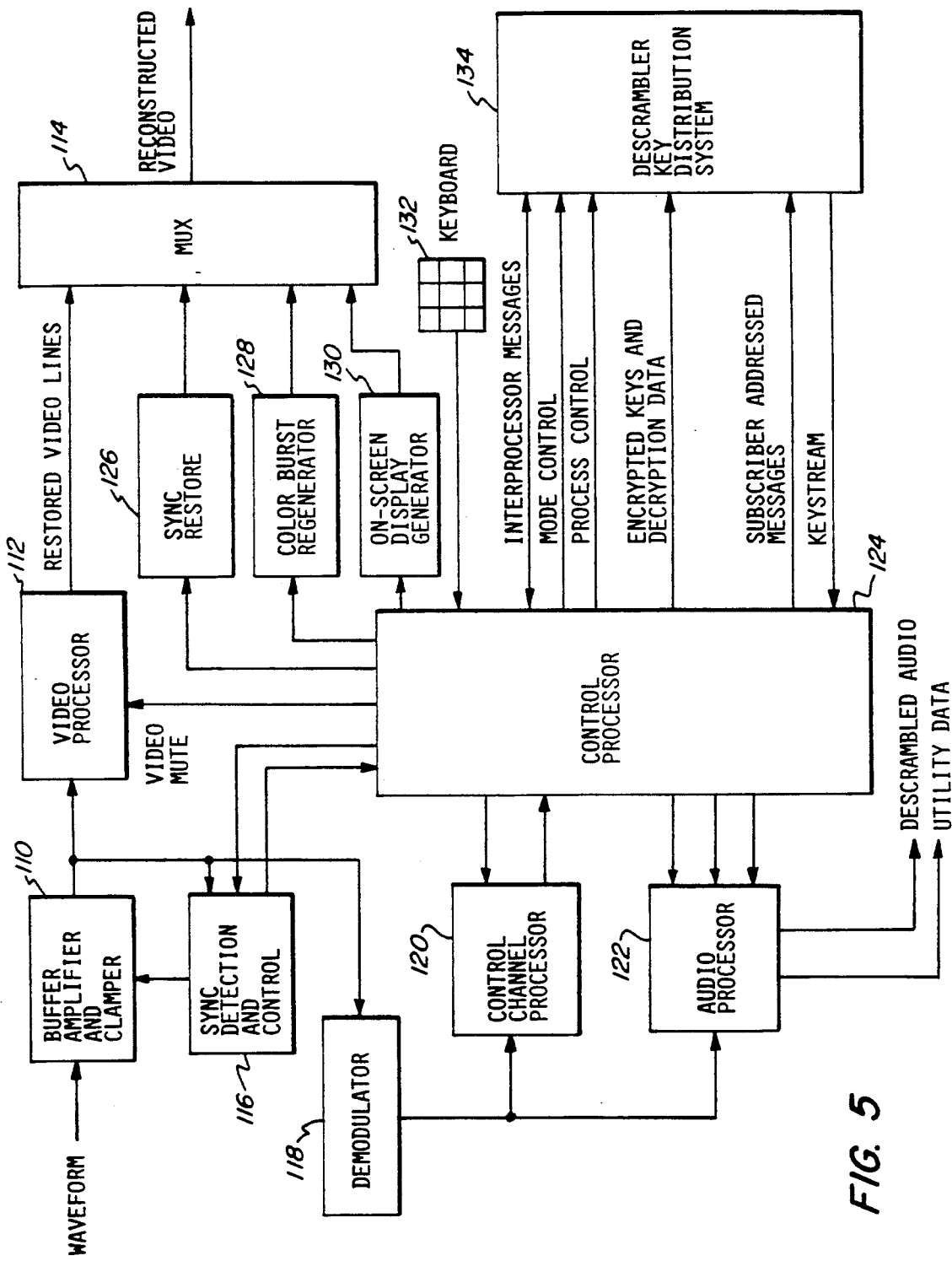
FIG. 5 is a block diagram of a decoder for recovering video and digital audio/data information from a composite waveform in accordance with the present invention.

Referring to FIG. 5, a decoder in accordance with the present invention includes a buffer amplifier and clamper circuit 110, a sync detection and control circuit 116, a control processor 124, a demodulator circuit 118, an audio processor 122, a color burst regenerator 128, a sync restore generator 126, and a multiplexer 114. Also provided are a video processor 112, control channel processor 120, audio processor 122, descrambler key distribution system 134, on screen display generator 130, and keyboard 132.

The buffer amplifier and clamper circuit 110 provide an interface for receiving the incoming scrambled signal and includes an AGC amplifier that is adjusted in a conventional manner by a gain control signal (not shown) from control processor 124. The filtered and clamped scrambled signal waveform is provided to the demodulator 118, the sync detection and control circuit 116 and to the video processor 112.

The video processor inverts the video portion of the waveform and provides a restored video output signal to the multiplexer 114. Video processor 112 is responsive to a video mute signal from the control processor to enable the control processor to "blank" the screen when operating in multiple audio mode or when the on screen display is activated to enable subscriber interface with the decoder. The sync restore generator 126 provides horizontal and vertical synchronization signals and inserts them in the correct waveform locations via multiplexer 114, with reference timing provided by control processor 124. A burst signal is also reconstituted and inserted in the proper horizontal blanking interval locations via multiplexer 114. In a case where a shorter than standard color burst is used, a color burst regenerator as provided in Katznelson U.S. Pat. No. 4,719,505 entitled "Color Burst Regeneration", incorporated herein by reference, can be utilized.

Sync detection and control circuit 116 contains a synchronization sequence detector that serves two functions. The first function is to provide a frame sync signal to the control processor in response to the detection of one of a number of predetermined synchronization sequences in the received composite waveform. The predetermined synchronization sequence is present in line 1 of field 1 of the composite signal. When the descrambler is unsynchronized, detection of the first synchronization sequence in the signal resets line and frame sync counters in the control processor, thereby synchronizing internal sampling, sync restoration, and burst counters to the incoming waveform. The second function of the sync detection and control circuit is to determine the waveform mode of the incoming signal. Sync detection and control circuit 116 includes two comparators that are loaded with a television mode synchronization value and a multiple audio mode synchronization value. If either synchronization pattern is detected in line 1 of a received composite waveform, a sync detect signal is sent to the control processor along with a waveform mode signal indicating whether the incoming signal contains video or multiple audio channels in the "video" portions of the waveform.

Demodulator 118 converts the clamped and buffered waveform into I and Q bit data streams for submission to the control channel and audio processors 120, 122. Control channel messages are sampled and decoded by the control channel processor which forwards the messages to the control processor. The control processor in turn forwards the control channel messages to the descrambler distribution system 134. This system decrypts and decodes the control channel messages in accordance with the method described by Bennett, et al in U.S. Pat. No. 4,864,615 referred to above. Descrambler key distribution system 134 then provides a keystream output to the control processor based upon a subscriber's entitlements and service selection. Thus, if a subscriber selects a television or audio program, and is authorized to receive that program, the necessary keystream to decrypt the digital data will be output by descrambler key distribution system 134.

The output of demodulator 118 also feeds the audio processor which, in television mode, samples the I and Q bit data during the horizontal blanking interval to obtain the television program audio ("audio 1"). Audio processor 122 then processes this sampled data in accordance with the system disclosed in Paik, et al U.S. Pat. No. 4,608,456 using the keystream provided by the control processor, and outputs a stereo audio signal ("descrambled audio").

In a preferred embodiment of the present invention, several extra bits are provided in each audio channel that are not utilized for the audio signals. This enables a separate utility data stream to be provided for each audio channel. The utility data stream can be used for any desired purpose, such as routing program specific control signals to the decoder. The utility data is recovered by audio processor 122 in the same manner in which descrambled audio is recovered.

When a composite waveform is received at the decoder, and sync detection and control circuit 116 indicates that the incoming waveform contains multiple audio channels of information, control processor 124 notifies the descrambler key distribution system of this fact via the mode control signal. The control processor also enables the display of a message on a television set coupled to receive the reconstructed video from multiplexer 114, enabling a subscriber to select the desired audio service. When the subscriber selects an audio channel via keyboard 132, the control processor notifies the descrambler key distribution system of the selection. The descrambler key distribution system compares the subscriber's entitlements to the selected audio program, and if the subscriber is authorized, generates the proper keystream for descrambling the program.

An important aspect of the present invention is that the relative distance between the audio sampling windows 90 to 97 illustrated in FIG. 4 is identical from line to line and the distance between the location of the same audio channel in successive lines corresponds exactly to the length of one NTSC video line. This enables a descrambler equipped to decode an audio signal associated with a television program service to utilize the very same audio decoding circuitry to decode any one of the multiple audio services ("audio 1" through "audio 9") by simply offsetting the sampling waveform (audio sampling gate 100) by a fixed amount. As a result, a significant cost savings over other time division multiplexed methods of audio service distribution is achieved, since only a small portion of additional circuitry is required to implement the multiple audio programming features of the present invention. It should also be noted that in multiple audio channel transmission mode, the fact that the digital audio portion repeats on every line implies that placing any non-audio information in a single line prevents the corresponding interval in other lines from being used for audio purposes. Therefore, in order to maximize the capacity of this transmission scheme, the AGC reference signals of lines 2–525 are placed in intervals and have durations that correspond to those of the synchronization signal at location 88 of line 1 (FIG. 4).

It should now be appreciated that the present invention provides a system for selectively transmitting horizontal television lines including video and digital audio components or equivalent digital lines containing a plurality of audio/data program signals. Where a plurality of audio/data program signals are transmitted, they are placed in the portion of the output waveform where video information is normally contained. Decoder apparatus recovers a selected audio channel by retrieving the corresponding data from the same time slot in successive "video" lines.

Although the invention has been described in connection with a preferred embodiment thereof, those skilled in the art will appreciate that numerous adaptations and modifications may be made thereto without departing from the spirit and scope of the following claims.

What is claimed is:

1. Apparatus for selectively transmitting horizontal television lines including video and digital audio components or equivalent digital data lines containing a plurality of audio program signals, comprising:
   first means for combining signals into a composite waveform;
   means for coupling a first digital audio signal to said first means for inclusion in said composite waveform;
   second means for providing a multiplexed plurality of digital audio signals;
   switch means for selectively coupling either a video signal or said multiplexed plurality of digital audio signals to said first means for inclusion in said composite waveform; and
   means, operatively associated with said switch means, for coupling identification data to said first means for inclusion in said composite waveform, wherein said identification data indicates whether said composite waveform includes the video signal or the multiplexed plurality of digital audio signals.

2. Apparatus in accordance with claim 1 further comprising:
   encryption means operatively associated with said second means for providing independent encryption of different audio signals.

3. Apparatus in accordance with claim 2 further comprising:
   means for coupling control channel data to said first means for inclusion in said composite waveform.

4. Apparatus in accordance with claim 3 further comprising:
   means for coupling timing data to said first means for inclusion in said composite waveform.

5. Apparatus in accordance with claim 4 wherein said composite waveform comprises:
   a plurality of successive lines of information;
   a first block in at least one of said lines containing said first digital audio signal data;
   a second block, following said first block, containing said timing data;
   a third block, following said first block, containing said control channel data;
   a fourth block, following said first block, containing said identification data; and
   a window comprising the remaining portion of said line following said first, second, third and fourth blocks, said window containing video information when said video signal is coupled to said first means and audio information when said multiplexed plurality of digital audio signals is coupled to said first means.

6. Apparatus in accordance with claim 5 further comprising:
   means for coupling a first synchronization control signal to said first means for inclusion in said composite waveform when said video signal is coupled to the first means; and
   means for coupling a second synchronization control signal to said first means for inclusion in said composite waveform when said multiplexed plurality of digital audio signals is coupled to the first means.

7. Apparatus in accordance with claim 6 wherein said first and second synchronization control signals provide said identification data.

8. Apparatus in accordance with claim 5 wherein said multiplexed plurality of digital audio signals comprise up to eight different audio program signals time division multiplexed to fit within an eight data block allocation provided in said window.

9. Apparatus in accordance with claim 1 further comprising:
   means for coupling timing data to said first means for inclusion in said composite waveform.

10. Apparatus in accordance with claim 9 further comprising:
    means for coupling control channel data to said first means for inclusion in said composite waveform.

11. A decoder for a composite waveform received from the apparatus of claim 1 comprising:
    means for recovering said identification data from the received composite waveform;
    means for recovering synchronization data from the received composite waveform;
    means responsive to said synchronization and identification data for recovering said first digital audio signal and associated video data when the identification data indicates that video data is present in said waveform; and
    means responsive to said synchronization and identification data for selectively retrieving said first digital audio signal or an individual digital audio signal from said multiplexed plurality of digital audio signals when the identification data indicates that the multiplexed plurality of digital audio signals is present in said composite signal.

12. Apparatus in accordance with claim 11 wherein said synchronization data and identification data are commingled.

13. Apparatus in accordance with claim 11 further comprising:
    means for recovering utility data appended to a retrieved digital audio signal.

14. Decoder apparatus for recovering video and digital audio information from a composite waveform comprising:
    means for recovering an identification signal from a composite waveform;
    means responsive to said identification signal for determining whether the composite waveform is carrying a line of video information or a plurality of digital audio channels in place of video information;
    first means responsive to said determining means for recovering video and associated audio information when provided in said waveform; and
    second means responsive to said determining means for recovering a selected digital audio channel when digital audio channels are provided in said waveform without video.

15. Apparatus in accordance with claim 14 wherein:
    said composite waveform comprises a plurality of successive lines of information;
    said successive lines are divided into a plurality of time slots containing a particular type of data;
    said time slots are constrained to the same location in each successive line when they contain corresponding digital audio channels from said plurality; and
    said second means are responsive to a synchronization signal retrieved from said waveform, to recover data for a selected digital audio channel from the same time slot in each successive line of the waveform containing the selected channel.

16. Apparatus in accordance with claim 15 wherein:
    said first means are responsive to a synchronization signal retrieved from said waveform, to recover the associated audio signal from a time slot assigned thereto and recover the video information from a video portion of each line.

17. Apparatus in accordance with claim 16 wherein:
    said synchronization signals are retrieved from a single line in a set of lines equivalent to a video frame.

18. Apparatus in accordance with claim 14 further comprising:
    means operatively associated with said second means for decrypting a recovered audio channel, wherein said decryption is unique to the recovered channel.

19. Apparatus in accordance with claim 18 further comprising:
    means operatively associated with said first means for decrypting recovered video and associated audio information, wherein the decryption of the associated audio information is unique thereto.

20. Apparatus in accordance with claim 14 further comprising:
    means for recovering utility data appended to a recovered digital audio signal.

21. Apparatus for transmitting a plurality of digital audio programs comprising:
    means for combining data packets from a plurality of digital audio programs into a corresponding plurality of program intervals in a waveform segment having a period equivalent to the period of a television line, each program interval having a duration that is no more than a television horizontal blanking interval; and
    means coupled to an output of said combining means for transmitting sequential waveform segments containing successive data packets from said plurality of digital audio programs;
    wherein the successive data packets for each digital audio program in the sequential waveform segments are separated by a time period that is equivalent to said television line period.

22. Apparatus in accordance with claim 21 wherein at least one waveform segment in a set of said sequential waveform segments includes a synchronization signal in a synchronization interval of the waveform segment.

23. Apparatus in accordance with claim 22 wherein other waveform segments in said set include an AGC signal in said synchronization interval.

24. Apparatus in accordance with claim 23 wherein each program interval is approximately six microseconds in duration and said synchronization interval is approximately four microseconds in duration.

25. Apparatus in accordance with claim 24 wherein said waveform segments each contain nine essentially equal program intervals in addition to said synchronization interval.

26. Apparatus in accordance with claim 23 wherein:
    said set comprises 525 consecutive waveform segments;
    said synchronization signal is provided in the synchronization interval of one of the waveform segments of said set; and
    said AGC signal is provided in the synchronization interval of the other 524 waveform segments of said set.

27. A decoder for waveform segments received from the apparatus of claim 21 comprising:
  means for selecting one of said digital audio programs for recovery; and
  means, responsive to said selecting means, for retrieving successive data packets for the selected program from sequentially received waveform segments at a rate that is equivalent to said television line period.

28. A decoder in accordance with claim 27 wherein said received waveform segments include a synchronization interval and said retrieving means are synchronized with said data packets by a synchronization signal carried in the synchronization interval of at least one waveform segment in a set of received waveform segments.

29. A decoder in accordance with claim 28 further comprising means, responsive to an AGC signal carried in the synchronization interval of other waveform segments in said set, for controlling the gain of said decoder.

30. A decoder for recovering a selected digital audio program from a plurality of such programs carried as data packets in program intervals of sequential waveform segments, said program intervals having a duration that is no more than a television horizontal blanking interval and said waveform segments having a period equivalent to a television line period, comprising:
  means for selecting one of said digital audio programs for recovery; and
  means, responsive to said selecting means, for retrieving successive data packets for the selected program from sequentially received waveform segments at a rate that is equivalent to said television line period.

31. A decoder in accordance with claim 30 wherein said received waveform segments include a synchronization interval and said retrieving means are synchronized with said data packets by a synchronization signal carried in the synchronization interval of at least one waveform segment in a set of received waveform segments.

32. A decoder in accordance with claim 31 further comprising means, responsive to an AGC signal carried in the synchronization interval of other waveform segments in said set, for controlling the gain of said decoder.

33. A decoder in accordance with claim 32 wherein:
  said set comprises 525 consecutive waveform segments;
  said synchronization signal is provided in the synchronization interval of one of the waveform segments of said set; and
  said AGC signal is provided in the synchronization interval of the other 524 waveform segments of said set.

34. A decoder in accordance with claim 33 wherein each program interval is approximately six microseconds in duration and said synchronization interval is approximately four microseconds in duration.

35. A decoder in accordance with claim 34 wherein said waveform segments each contain nine essentially equal program intervals in addition to said synchronization interval.

36. A decoder in accordance with claim 30 wherein each program interval is approximately six microseconds in duration and said synchronization interval is approximately four microseconds in duration.

37. A decoder in accordance with claim 36 wherein said waveform segments each contain nine essentially equal program intervals and a synchronization interval.

* * * * *